Patented May 13, 1947

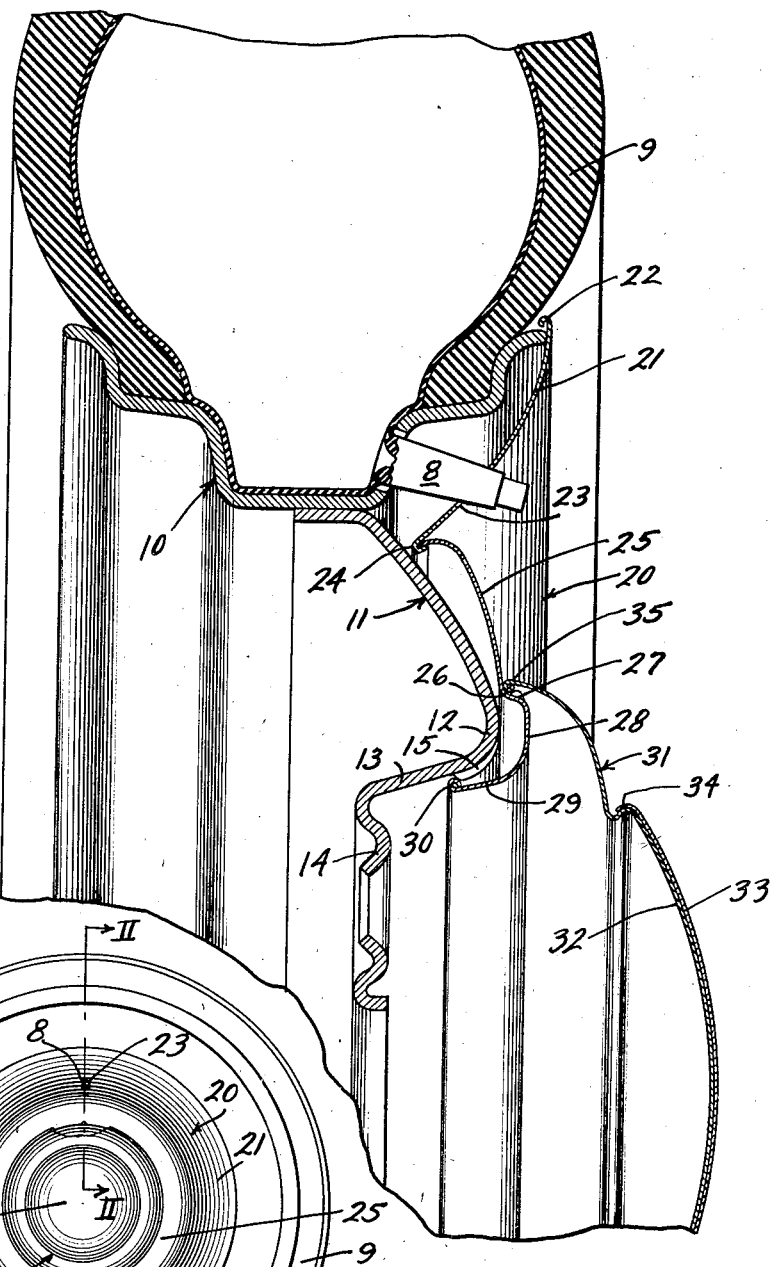
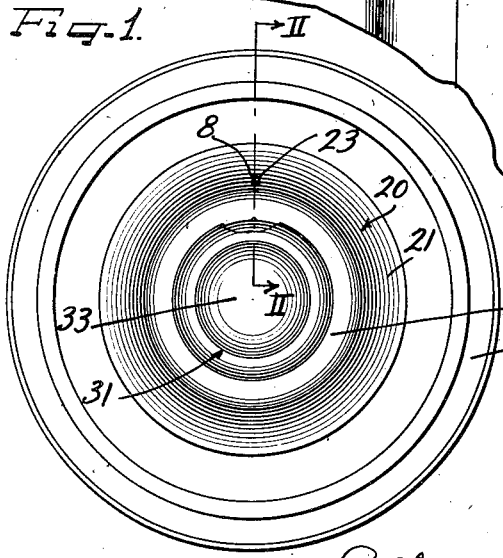

2,420,321

UNITED STATES PATENT OFFICE 2,420,321

WHEEL TRIM

George Albert Lyon, Allenhurst, N. J.

Application May 12, 1945, Serial No. 593,476

3 Claims. (Cl. 301—37)

This invention relates to a multi-part wheel trim and more particularly to an automobile wheel cover.

In the fabrication of trim and hub caps for automobile wheels, it is highly essential that they be made as economically as is feasible in order for them to be commercially acceptable by the automobile trade. One of the main factors in the cost of such parts is the material. For this reason any improvement in the process of manufacturing the same which will lessen the cost of the material, such for example as by lessening the waste, is very desirable.

It is an object of this invention to provide a multi-part wheel trim and hub cap assembly which may be very economically manufactured on a large production basis.

It is a further object of this invention to provide a wheel trim and hub cap assembly wherein the parts will readily cooperate with each other on a wheel, and which will permit the use of existing wheel structures without necessitating the modification of the same.

A feature of the invention relates to the provision of a multi-part wheel cover and hub cap assembly wherein the wheel cover comprises two concentric annular rings, the outer of which for covering the exposed flanges of the tire rim, and the inner of which for retaining cooperation with the body part of the wheel and with a section having hub cap retaining means and wherein the hub cap is reinforced at its center from the waste of the center of the inner ring and is also provided with an outer marginal edge for detachably retaining cooperation with the retaining means on the cover.

Yet another feature of the invention relates to providing a radially inner ring of the aforesaid cover with a resilient diaphragm section adapted to yield axially in the pressing of the inner margin of the cover into retaining cooperation with the body part of the wheel and whereby the cover can accommodate limited manufacturing variations in the parts of the wheel.

Other objects and features of this invention will more fully appear from the following detailed description taken in connection with the accompanying drawings which illustrate a single embodiment thereof and in which Figure 1 is a front view of a wheel structure embracing the features of this invention with the hub cap partly broken away to show one of the retaining protuberances on the wheel cover; and Figure 2 is an enlarged fragmentary cross-sectional view taken on the line II—II of Figure 1 looking in the direction indicated by the arrows.

As shown on the drawings:

Referring to Figure 2 the reference character 9 designates generally a conventional pneumatic tire and tube carried in the usual way on a multi-flanged drop center type of tire rim 10. The tube of the tire includes the usual valve stem 8 projecting through an aperture in one of the flanges of the rim part.

The tire rim part is carried upon a load bearing or body part designated generally by the reference character 11 and which, as is customary now, may comprise a sheet metal stamping. This body part is suitably fastened to the base flange of the rim part and has a centrally bulged nose portion 12 leading into a depressed portion 13 which in turn terminates in a generally radially extending bolt-on flange 14 by means of which the wheel may be secured by bolts or cap screws (not shown) to the usual support on an axle, such as a brake drum. The central depressed portion 13 adjacent the nose 12 is provided with a plurality of undercut protuberances 15 which are at present commonly used to hold a hub cap on the center of the body part. I propose to use these protuberances to retain my novel cover on the wheel and to hold the hub cap on a wheel by retaining means on the cover as I shall describe hereinafter.

The cover of my invention is designated generally by the reference character 20 and embraces an outer ring 21 having an outer turned edge 22 arranged to overhang an outer edge of the rim 10 in close proximity to the side wall of the tire. This ring 21 may be provided with an aperture 23 through which the outer end of the valve stem 8 can project so as to enable access to the valve stem without necessitating removal of the cover from the wheel.

The cross-sectional contour of the ring 21 is such that it extends radially and axially inwardly from the turned edge 22 to a turned edge 24 directly over the body part and which is lock-seamed to the outer edge of the radially inner trim ring 25.

This ring 25 is bulged or turned at 26 slightly outwardly and the turned portion is provided with a plurality of radially outwardly extending spaced protuberances 27 for retaining cooperation with a hub cap to be hereinafter described. The inner margin of the ring 25 is formed into a flattened resilient diaphragm-like section 28, which has its radially inner portion turned axially rearwardly at 29 and formed into a turned edge 30 adapted to be cammed over and into retaining cooperation with the undercut bumps 15 on the body part. It will be noted that the bumps 15 face radially inwardly whereas the bumps 27 face radially outwardly.

Cooperable with the outer bumps 27, which may be of any suitable number such for example as three to five, is a central hub cap designated generally by the reference character 31 and which includes a crown portion 32 over which is snugly fitted a reinforcing and ornamenting crown part 33 having its outer edge turned at 34 and spun into locked engagement with the outer margin of the crown portion 32.

The outer edge of the hub cap 31 is turned at 35 and is of such diameter that it may be resiliently snapped over the bumps 27 into retaining cooperation therewith and so that the bumps tightly hold the turned edge against the turned portion 26 of the inner cover ring 25.

In the application of the cover 20 to the wheel, the hole 23 thereof is first aligned with the valve stem 8 and thereafter the cover is pressed axially inwardly until its outer portion edge 22 engages the edge of the rim.

Then the hub cap 31 is placed over the center of the cover and by pressing it axially rearwardly its edge 35 is not only forced into retaining engagement with the bumps 27 but the inner edge 30 of the cover is forced over the bumps 15 and into retaining cooperation with the rear edges of the bumps. This rearwardly movement of the edge 30 is permitted by the yielding of the resilient diaphragm section 28. In fact relatively little pressure is required, due to the flattened formation of the section 28, in order for the edge 30 to be bodily deflected axially rearwardly over and behind the rear edges of the bumps 15.

An alternative method of applying the cover is also possible namely that of first pressing the cover 20 home into retained engagement with the bumps 15 and thereafter applying the hub cap 31 thereto.

The hub cap 31 may be easily removed from the wheel by inserting a screw driver under its outer edge 35 and prying it free of the bumps 27. Similarly the cover 20 may be detached from the wheel by inserting a pry-off tool under the edge 22 and thereby prying it free of its retaining cooperation with the bumps 15. It should be noted that the intermediate lock-seam 24 serves to reinforce and rigidify the cover.

In addition, the outer ring 21 by reason of its contour and radial depth will, in use, appear to constitute a continuation of the side wall of the tire. This optical illusion can be emphasized by finishing the outer surface of the ring 21 in which event it will appear to constitute a white side wall part of the tire.

I claim as my invention:

1. In a cover structure for a wheel including tire rim and body parts, the latter of which is provided with centrally arranged cover retaining means, a wheel cover comprising two concentric annular rings joined together, the radially inner of which being provided with a substantially flat yieldable diaphragm-like section and with an edge movable upon yielding of said section into retaining cooperation with the means on the body part, said inner ring also being provided with hub cap retaining means radially outwardly of said section.

2. In a cover structure for a wheel including tire rim and body parts, the latter of which is provided with centrally arranged cover retaining means, a wheel cover comprising two concentric annular rings joined together, the radially inner of which being provided with a substantially flat yieldable diaphragm-like section and with an edge movable upon yielding of said section into retaining cooperation with the means on the body part, said inner ring also being provided with hub cap retaining means radially outwardly of said section and a hub cap concealing said section and detachably snapped into retention with the means on said second ring.

3. The cover of claim 1 further characterized by the outer ring extending radially and axially inwardly from an outer edge of the tire rim adjacent the tire to said junction directly over a body part of the wheel.

GEORGE ALBERT LYON.

REFERENCES CITED

The following references are of record in the file of this patent:

UNITED STATES PATENTS

| Number | Name | Date |
|---|---|---|
| 2,148,211 | Lyon | Feb. 21, 1939 |
| 2,306,631 | Lyon | Dec. 29, 1942 |
| 2,147,661 | Lyon | Feb. 21, 1939 |
| 2,368,229 | Lyon | Jan. 30, 1945 |